(12) United States Patent
Silventoinen et al.

(10) Patent No.: US 10,335,977 B2
(45) Date of Patent: Jul. 2, 2019

(54) METHOD FOR TREATING A WOOD BOARD

(75) Inventors: Ilpo Silventoinen, Puhos (FI); Kasperi Sokka, Jyväskylä (FI); Juha Lipponen, Puhos (FI)

(73) Assignees: SURFACTOR GERMANY GMBH, Schoppenstedt (DE); METSALIITTO OSUUSKUNTA, Espoo (FI)

( * ) Notice: Subject to any disclaimer, the term of this patent is extended or adjusted under 35 U.S.C. 154(b) by 409 days.

(21) Appl. No.: 13/000,939

(22) PCT Filed: Jun. 26, 2009

(86) PCT No.: PCT/FI2009/050574
§ 371 (c)(1),
(2), (4) Date: Apr. 4, 2011

(87) PCT Pub. No.: WO2009/156594
PCT Pub. Date: Dec. 30, 2009

(65) Prior Publication Data
US 2011/0183076 A1    Jul. 28, 2011

(30) Foreign Application Priority Data
Jun. 27, 2008  (FI) ...................................... 20085652

(51) Int. Cl.
*B27N 7/00* (2006.01)
*B05D 5/08* (2006.01)
*B05D 7/06* (2006.01)
*B27K 3/15* (2006.01)
*B27K 3/34* (2006.01)
*B27K 3/36* (2006.01)
*C08L 83/04* (2006.01)
*B05D 7/00* (2006.01)

(52) U.S. Cl.
CPC ............... *B27N 7/00* (2013.01); *B05D 5/08* (2013.01); *B05D 7/06* (2013.01); *B05D 7/54* (2013.01); *B27K 3/15* (2013.01); *B27K 3/343* (2013.01); *B27K 3/36* (2013.01); *B27K 2200/10* (2013.01); *B27K 2240/70* (2013.01); *C08L 83/04* (2013.01)

(58) Field of Classification Search
CPC ..................................... B05D 5/08; B05D 7/06
See application file for complete search history.

(56) References Cited

U.S. PATENT DOCUMENTS

| | | | |
|---|---|---|---|
| 2,400,016 A | 5/1946 | Meyer | |
| 3,240,618 A | 3/1966 | Hemming | |
| 3,703,394 A | 11/1972 | Hemming et al. | |
| 3,808,037 A | 4/1974 | Story | |
| 3,844,829 A | 10/1974 | Black | |
| 4,265,958 A | 5/1981 | Blom et al. | |
| 4,360,385 A | 11/1982 | Grunewalder | |
| 4,404,239 A | 9/1983 | Grunewalder | |
| 4,581,298 A | 4/1986 | Fox | |
| 4,913,972 A | 4/1990 | Grunewalder et al. | |
| 4,971,837 A * | 11/1990 | Martz ................. | C08F 299/065 427/388.2 |
| 5,486,231 A | 1/1996 | Dulaney | |
| 5,601,930 A | 2/1997 | Mehta et al. | |
| 5,885,340 A * | 3/1999 | Bailey .................... | D21H 19/44 106/209.1 |
| 6,132,885 A | 10/2000 | Peek et al. | |
| 6,342,268 B1 * | 1/2002 | Samain ...................... | 427/248.1 |
| 6,479,127 B1 | 11/2002 | Kornicer et al. | |
| 2004/0089433 A1* | 5/2004 | Propst et al. ................. | 162/158 |
| 2006/0165808 A1 | 7/2006 | Huet De Barochez et al. | |
| 2006/0264519 A1 | 11/2006 | Eckert et al. | |
| 2007/0116732 A1* | 5/2007 | Goebel ................ | B05D 3/0209 424/405 |
| 2007/0181035 A1 | 8/2007 | Wantling et al. | |
| 2008/0193785 A1* | 8/2008 | Kingma et al. ............... | 428/541 |
| 2009/0264577 A1* | 10/2009 | Blum et al. .................... | 524/501 |
| 2009/0297760 A1 | 12/2009 | Arnoldt | |
| 2009/0304939 A1* | 12/2009 | Korpela .............. | B05D 3/0254 427/397 |

FOREIGN PATENT DOCUMENTS

| | | |
|---|---|---|
| DE | 101 22 627 A1 | 11/2002 |
| DE | 10 2004 041 032 A1 | 10/2005 |
| EA | 007571 B1 | 12/2006 |
| EA | 017468 B1 | 12/2012 |
| EP | 0278305 A1 | 8/1988 |
| EP | 0 623 656 A2 | 11/1994 |
| EP | 02/04133 | 1/2002 |
| EP | 1 716 995 A2 | 11/2006 |
| GB | 807090 B | 1/1959 |
| GB | 1 541 579 A | 3/1979 |
| JP | 59-22685 | 2/1984 |
| JP | 1996-188607 A | 1/1998 |
| JP | 2005-522532 A | 7/2005 |
| WO | 96/11301 A1 | 4/1996 |
| WO | WO 02/090069 A1 | 11/2002 |
| WO | WO 2005/009700 A1 | 2/2005 |
| WO | 2006/117163 A1 | 11/2006 |
| WO | 2007/019057 A1 | 2/2007 |
| WO | WO 2007/088245 A1 | 8/2007 |
| WO | 2008/034948 | 3/2008 |

OTHER PUBLICATIONS

Feist, W. & Mraz, E., Wood Finishing: Water repellents and water-repellent preservatives, Research Notes FPL-0124, Forest Products Laboratory, May 1989.*
Butcher Block Refinishing, Minwax.com forums, May 2008, pp. 1-4, found at https://www.minwax.com/minwax-bbs/bbs/viewthread_thread,33378.*
Finishes for Butcher Blocks, Countertops, and Wooden Utensils; Advanced Housing Research Center, Forest Products Laboratory, Madison, Wisconsin, May 2000.*
Use & Care, Kitchen Kapers, Mar. 9, 2005; found at http://web.archive.org/web/20050309100717/http://www.kitchenkapers.com/useandcare1.html.*

(Continued)

Primary Examiner — James Mellott
(74) Attorney, Agent, or Firm — Merchant & Gould P.C.

(57) ABSTRACT

The invention relates to a method for treating a wood board. According to the invention, a composition containing a hydrophobic agent is provided onto the surface of the wood board and coating agent is provided over it to form a coating layer.

13 Claims, No Drawings

(56) References Cited

OTHER PUBLICATIONS

Hotton, P.,Butcher Block table simple to refinish, SF Gate, http://www.sfgate.com/homeandgarden/article/Butcher-block-table-simple-to-refinish-2904538.php, Jun. 30, 2001.*
Spearboard.com Materials for cutting boards in San Diego, Jun. 18, 2007; found at http://www.spearboard.com/showthread.php?t=47752.*
Alibaba, Bamboo Cutting Board, veneer plywood, Jan. 17, 2004; found at http://xywm.en.alibaba.com/product/535525669-213332544/Bamboo_Cutting_Board_veneer_plywood.html.*
Roger M. Rowell, "Handbook of Wood Chemistry and Wood Composites", Second Edition, © 2013 by Taylor & Francis Group, LLC., p. 402.
Arthur F. Verrall, "Preserving Wood by Brush, Dip and Short-Soak Methods", Technical Bulletin No. 1334, U.S. Department of Agriculture, Forest Service, May 1965, pp. 1-4.
"Parrafin Wax", Wikipedia: The free encyclopedia, Wikimedia Foundation, Inc., pp. 1-4. Retrieved Sep. 19, 2016, from https://en.wikipedia.org/wiki/Paraffin_wax.
Summons to Attend Oral Proceedings Pursuant to Rule 115(1) EPC issued in European Application No. 09769437.6, dated Mar. 2, 2018.

* cited by examiner

METHOD FOR TREATING A WOOD BOARD

This application is a National Stage Application of PCT/FI2009/050574, filed 26 Jun. 2009, which claims benefit of Serial No. 20085652, filed 27 Jun. 2008 in Finland and which applications are incorporated herein by reference. To the extent appropriate, a claim of priority is made to each of the above disclosed applications.

FIELD OF THE INVENTION

The invention relates to a method as defined in the preamble of claim 1 for treating a wood board.

BACKGROUND OF THE INVENTION

Known from the prior art are various methods for use in the treatment and coating of plywood, chipboard, fibre board and OSB products and the like.

Known from the prior art are various coatings consisting of paper, resin and different additives. Typically, phenolic resin, amino resin or equivalent resins or their mixtures in different mixture ratios are used as the resin.

The service value of a wood board, in particular of coated plywood, is reduced if holes appear in the coating. In this case, the top veneer would easily absorb moisture from the air, water or e.g. from wet concrete in connection with casting. From the holes, the moisture would easily spread in the direction of the wood grains and cause local swelling of the grains, i.e. rippling, and thereby blistering of the surface of the wood board.

OBJECTIVE OF THE INVENTION

The objective of the invention is to eliminate the drawbacks referred to above. In particular, it is the objective of the invention to disclose a novel method of treatment to provide a wood board of improved quality.

SUMMARY OF THE INVENTION

The method according to the invention is characterized by what has been presented in the claims.

The invention is based on a method for treating a wood board. According to the invention, a composition containing a hydrophobic agent is provided onto the surface of a wood board and coating agent is provided over it to form a coating layer on the surface of the wood board treated with the hydrophobic composition.

In this context, wood board refers to any product formed mainly from wood-based materials and which may have been formed from a number of layers, in particular from veneer layers. The wood board may include plywood, chipboard, fibre board, OSB, glue wood, LVL, PSL, OSL or the like. The wood board may be a coated board which has been coated e.g. by a porous coating.

The invention is specifically based on a method for preventing swelling of the top veneer of a coated wood board. The invention is specifically based on treating the surface of the wood board with a hydrophobic agent and coating the treated wood board. According to the invention, the hydrophobic composition to be provided on the surface of the wood board allows coating of the wood board without problems.

In one embodiment of the invention, the hydrophobic composition contains the hydrophobic agent in an amount of about 60 to 100% by weight. In one embodiment, the hydrophobic composition contains the hydrophobic agent in an amount of about 80 to 100% by weight.

In one embodiment of the invention, the hydrophobic agent is selected from the group of waxes, oils, fats, fatty acids, alkanes, alkenes and their derivatives and their mixtures. In one embodiment, the hydrophobic agent is paraffin wax. In one embodiment, the hydrophobic agent is silicone oil. In one embodiment, the hydrophobic agent is alkene ketene dimer (AKD). In one embodiment, the hydrophobic agent is alkenyl succinic anhydride (ASA). In one embodiment, the hydrophobic agent is tall oil fatty acid. In one embodiment, the hydrophobic agent is stearine. In one embodiment, the hydrophobic composition contains one hydrophobic agent. In one embodiment, the hydrophobic composition contains more than one hydrophobic agent. In one embodiment, the amount of wax may be reduced by using other hydrophobic agents, e.g. fluorine compounds or silicones, mixed with the wax in the hydrophobic agent mixture.

Preferably, the hydrophobic ingredient penetrates into the wood grains. Preferably, it is possible to absorb any desired additives into the wood grains with the hydrophobic ingredient.

In one embodiment of the invention, the hydrophobic composition consists mainly of the hydrophobic ingredient. In addition, the hydrophobic composition may contain suitable additives and/or fillers.

In one embodiment, the hydrophobic composition contains a suitable resin, e.g. melamine, urea and/or phenolic resin, to provide better penetration of the hydrophobic ingredient into the wood board. The hydrophobic agent penetrates into the wood veneer or the surface of the board together with or in advance of the resin.

In one embodiment, the hydrophobic composition is in the liquid, molten, solid, emulsion and/or dispersion form. In one embodiment, the hydrophobic composition contains a suitable solvent or emulsifier. In one preferred embodiment, the emulsifier is selected so as to not have any negative effect on hygroscopicity of the wood or so as to not reduce hydrophobicity of the treatment agent.

In one embodiment, the coating agent to be provided as the coating on the surface of the wood board contains resin, lacquer and/or paint. In addition, the coating agent may contain suitable additives. The coating agent is provided as the coating on the surface of the wood board in a manner known per se, e.g. by hot pressing.

In one embodiment, the coating agent contains one or more resins selected from phenolic, amino, acrylate, urea, melamine, ureamelamine and/or equivalent resins. The phenolic resin may be a phenol-formaldehyde resin. The amino resin may be a melamine-formaldehyde resin. The resins may be unmodified or modified resins. The amino resins may be modified e.g. by glycol, caprolactam, acetoguanamine, benzoguanamine or p-toluene-sulphonamide, by alkylation or etherification. The phenolic resins may be modified e.g. by urea, melamine, lignin, resorcinol, modified phenols, cresols, bisphenols or other equivalent compounds. Any amino and phenolic resins known per se may be used as the amino and phenolic resins. By combining different types of resins, e.g. phenolic and amino resins, together in a suitable ratio, it is possible to improve and optimize the properties of the coating. In the resin mixture, any solvent in which the resin is soluble may be used as the solvent for the resin.

In one embodiment, additives, e.g. acrylic resin, wax emulsion, surfactant, softener, hardener, wetting agent, antifoam agent, diluent and/or alkali may be added to the coating if desired. The additives are preferably added to the resin mixture.

In one embodiment of the invention, the hydrophobic composition is provided on the surface of the wood board to treat the wood board, and the treated wood board is coated by the coating agent. Preferably, the hydrophobic composition is provided on the surface of the wood board as a separate layer. The layer of the hydrophobic composition is provided on the surface of the wood board between the coating layer and the wood board.

In one embodiment of the invention, the hydrophobic composition is provided on the surface of the wood board substantially in connection with the coating by the coating agent.

In one embodiment of the invention, the hydrophobic composition is provided, e.g. by absorbing or as a separate layer, in a carrier material from which it is conveyed to the surface of the wood board, either before coating or substantially in connection with the coating. The conveyance of the hydrophobic composition from the carrier material to the surface of the wood board may be carried out for example by means of a hot roller or by hot pressing.

In one embodiment, the film or mixture used as the coating contains the hydrophobic composition. In one embodiment of the invention, the hydrophobic composition is provided in the coating agent film e.g. as added to it, in a preferred embodiment as a separate layer. In connection with the coating agent film, the hydrophobic composition may be provided on one or both sides of the film. Preferably, the hydrophobic composition is provided in the coating agent film in such a manner that the layer of the hydrophobic composition is set at least between the surface of the wood board and the coating layer containing the coating agent.

In one embodiment, more than one coating film may be used as the coating. In one embodiment, a second coating film or a number of coating films are provided over the coating film treated with the hydrophobic agent.

Further, the invention is based on a coating used on the surface of a wood board, wherein the coating contains two layers, the first one being a layer of a hydrophobic composition and the second one being a layer of a coating agent, wherein the coating can be provided on the surface of the wood board in such a manner that the layer of the hydrophobic composition is set substantially between the surface of the wood board and the coating layer.

In one embodiment, the treatment of the wood board with the hydrophobic composition and the coating agent is carried out as a two-step process. In one embodiment, the treatment of the wood board with the hydrophobic composition and the coating agent is carried out as a single-step process. In an alternative embodiment, the hydrophobic composition is provided on the surface of the wood board and the wood board is coated substantially in separate processes.

In one embodiment of the invention, the hydrophobic composition and/or the coating layer are provided on the wood board by means of heat and pressure, preferably e.g. by hot pressing.

In one embodiment of the invention, the amount of the hydrophobic composition provided on the surface of the wood board is 20 to 100 g/m$^2$, preferably about 20 to 80 g/m$^2$, more preferably about 30 to 50 g/m$^2$.

The manufacturing of the wood board, providing the hydrophobic composition on the wood board and coating of the wood board may be carried out in manners known per se.

Preferably, the invention is applicable in the wood board industry, e.g. in the manufacture of plywood, chipboard, fibre board, MDF, OSB and/or other board products, or in the laminate product industry, such as in the manufacture of flooring laminates.

For each purpose, a suitable hydrophobic ingredient, additives and coating agent may be selected.

Thanks to the invention, a wood board of better moisture resistance than before is provided by the layer containing the hydrophobic ingredient. Preferably, the hydrophobic ingredient prevents spreading of water e.g. into the veneers and swelling of the veneer grains.

Another advantage of the invention is that the wood board treated with the hydrophobic agent is easy to be coated.

DETAILED DESCRIPTION OF THE INVENTION

In the following section, the invention will be described by means of detailed examples of its embodiments.

EXAMPLES

Example 1

Preliminary tests were carried out to examine the spreading of water into the wood board and the top veneer through holes made in the coating, and the resulting problems as well as a solution to them.

It was surprisingly discovered as a solution that the spreading of water through holes in the coating of the wood board and the swelling of the grains of the top veneer may be prevented by treating the surface of the wood board with a hydrophobic agent, such as e.g. paraffin wax. Wax can be easily applied over the surface of a wood board as a liquid or emulsion. In this case, the wax and the optional emulsifier or the like must be selected so as to not have any negative effect on the outcome. The wax may also be applied as molten or solid or it can be melted on the surface of the wood board. It is important that the selected wax does not prevent the coating of the wood board after the wax treatment. Instead of wax, also other hydrophobic chemicals exhibiting the same properties may be used.

The wax may be applied over the surface of the wood board before the wood board is coated. It can be applied over the surface of the wood board e.g. in the liquid form or it may be absorbed in a separate carrier material from which it is conveyed onto the surface of the wood board before the wood board is coated. Alternatively, the wax may be brought onto the surface of the wood board together with the coating. This can be carried out in at least two alternatives: 1) Treatment of the coating film by wax on one side, e.g. in a 2-step production process whereby the wax is conveyed to the surface of the wood board in connection with the coating as a separate layer; or 2) By preparing a coating agent mixture which is rich in said wax, e.g. a 50/50 wax-resin mixture. The coating according to method 2 is possibly not suitable alone to provide sufficient coating on the wood board, but it may be used as a base film with other suitable coating.

Example 2

Two test series were carried out, the first including five reference tests and eight tests and the second including one reference test and five tests. The tests were carried out to examine the effect of the waxing of plywood on anti-rippling, i.e. prevention of the swelling of the wood grains on a broken surface.

Samples of plywood were formed for the test series with birch used as the starting material. The samples of plywood were treated with wax and/or coated by a film at 120 and 220 g/m². The waxed and/or coated samples of plywood were tested in a rippling test.

The wax used in the tests was a hydrophobic Bekophob P60 paraffin wax emulsion. The wax was applied over the surface of the plywood in an amount of about 30 g/m².

The coating was carried out with Dynea film coatings based on phenolic resin at 120 g/m² or 220 g/m² in normal pressure conditions (about 18 kg/cm²/6 min/130° C.).

Samples of birch plywood which had not been subjected to a wax treatment and in which the above-mentioned coating films were used as the coating were employed as the reference.

In the rippling tests, a hole was made in the coating and a wet piece of paper/cloth was placed over the hole for 1 h and 3 h. The top veneer should not swell around the hole.

The first set of tests was carried out to study the effect of waxing of the plywood surface, or the effect of the wax-layered coating film provided on the surface, on rippling, i.e. swelling of the wood grains, as compared with the reference samples of plywood. The reference samples of plywood were formed from untreated plywood and different surface and/or base films. The tested samples of plywood were formed from either a) waxed plywood and different surface films or b) plywood and a base film, one side of which was provided with a wax layer at 40 g/m², and/or a surface film. The wax layer of the base film in the tested samples of plywood b was provided against the surface of the plywood.

Table 1 presents the test arrangements of the first test for treating and/or coating the samples of plywood, and the results obtained from the tests.

The results were evaluated by measuring the swelling around the hole in millimeters: (diameter of the swelling area—diameter of the hole) divided by two=swelling result. A smaller result, mm, indicates smaller swelling of the wood grains due to the provided hole.

In this context, surface structure refers to the thickness of the total coating on the surface of the plywood.

TABLE 1

| Test | Treatment | Surface structure, g/m2 | Swelling, mm, 1 h | Swelling mm, 3 h |
|---|---|---|---|---|
| ref1 | Untreated plywood + Light surface film | 120 | 20 | 25 |
| ref2 | Untreated plywood + Heavy surface film | 220 | 47 | 60 |
| ref3 | Untreated plywood + Light base film + Light surface film | 220 | 29 | 31 |
| ref4 | Untreated plywood + Light base film + Heavy surface film | 340 | 42 | 49 |
| ref5 | Untreated plywood + Heavy base film + Light surface film | 340 | 19 | 25 |
| 1 | Waxed plywood + Light surface film | 120 | 3 | 5 |
| 2 | Waxed plywood + Heavy surface film | 220 | 19 | 25 |
| 3 | Plywood + 1 wax-layered Light base film | 120 | 8 | 10 |
| 4 | Plywood + 1 wax-layered Heavy base film | 220 | 12 | 16 |
| 5 | Plywood + 1 wax-layered Light base film + Light surface film | 220 | 18 | 21 |
| 6 | Plywood + 1 wax-layered Light base film + Heavy surface film | 340 | 9 | 13 |
| 7 | Plywood + 1 wax-layered Heavy base film + Light surface film | 340 | 5 | 9 |
| 8 | Plywood + 1 wax-layered Heavy base film + Heavy surface film | 440 | 10 | 14 |

The second set of tests was also carried out to study the effect of the waxing of the plywood surface, or the effect of the wax-layered coating film provided on the surface, on rippling, i.e. swelling of the wood grains, as compared with the reference plywood. The reference plywood was formed from untreated plywood and a surface film. The tested samples of plywood were formed from either a) waxed plywood and a surface film, b) plywood and a base film, one side of which was provided with a wax layer at 40 g/m², and/or a surface film, or c) plywood and a base film, both sides of which were provided with a wax layer at 40 g/m², and/or a surface film. The wax layer of the base film in tested samples of plywood b and c was provided against the surface of the plywood.

Table 2 presents the test arrangements of the second test for treating and/or coating the samples of plywood, and the results obtained from the tests.

TABLE 2

| Test | Treatment | Surface structure, g/m2 | Swelling, mm, 1 h | Swelling, mm, 3h |
|---|---|---|---|---|
| ref6 | Untreated plywood + Heavy surface film | 220 | 31 | 41 |
| 9 | Waxed plywood + Heavy surface film | 220 | 4 | 5 |
| 10 | Plywood + 1 wax-layered Heavy base film | 220 | 9 | 15 |
| 11 | Plywood + 2 wax-layered Heavy base film | 220 | 1 | 3 |
| 12 | Plywood + 1 wax-layered Heavy base film + Light surface film | 340 | 2 | 5 |
| 13 | Plywood + 2 wax-layered Heavy base film + Light surface film | 340 | 1 | 2 |

It was discovered that in tests 1 to 13, samples of plywood were provided in which the swelling of the wood grains in the event of breaking of the surface was considerably smaller as compared with the reference samples of plywood. It was discovered that the waxing of the plywood surface as well as the wax-layered base films, both used in the tested samples of plywood, provided reduction in swelling of the wood grains. In addition, it was discovered that mixing the wax with the coating improved anti-rippling, i.e. prevention of local swelling.

By the tests it could be observed that a suitable hydrophobic wax which prevented swelling of the wood grains was discovered. Also, it was found that the coating was made to persist well on the surface of waxed plywood.

By the method according to the invention, it is also possible to reduce cracking of the coating because stretching and contracting of the top veneer is substantially reduced. This may permit easier coating of softwood plywood with light phenolic coatings and coating of plywood with melamine coatings.

Example 3

This set of tests was carried out to study, according to Example 2, the effect of different hydrophobic agents on rippling on both laboratory and pilot scale. In the tests, birch plywood was used and the surface was hydrophobized (Test 3: 30 g/m² and Test 4: 30/50 g/m²) with a selected hydrophobizing agent before coating the plywood surface with the coating film at 220 g/m². The surface of the reference plywood was not treated before coating. The test results are presented in Tables 3 (laboratory tests) and 4 (laboratory and pilot tests).

TABLE 3

| Test | Treatment | Surface structure, g/m2 | Swelling, mm, 1 h | Swelling, mm, 3 h |
|---|---|---|---|---|
| ref7 | Untreated plywood + Heavy surface film | 220 | 74 | 111 |
| 14 | Waxed plywood (paraffin 4110) + Heavy surface film | 220 | 6 | 14 |
| 15 | Waxed plywood (paraffin C80) + Heavy surface film | 220 | 9 | 23 |
| 16 | Waxed plywood (AKD, type K) + Heavy surface film | 220 | 7 | 13 |
| 17 | Waxed plywood (AKD, type C) + Heavy surface film | 220 | 10 | 21 |
| 18 | Waxed plywood (silicone oil) + Heavy surface film | 220 | 7 | 17 |
| 19 | Waxed plywood (polyglycol P1200) + Heavy surface film | 220 | 33 | 39 |

TABLE 4

| Test | Treatment | Surface structure, g/m2 | Swelling, mm, 1 h | Swelling, mm, 3 h |
|---|---|---|---|---|
| ref8 | Untreated plywood + Heavy surface film/ laboratory test | 220 | 59 | 69 |
| ref9 | Untreated plywood + Heavy surface film/ pilot test | 220 | 59 | 69 |
| 20 | Waxed plywood (paraffin 5205, 50 g/m²) + Heavy surface film/laboratory test | 220 | 5 | 10 |
| 21 | Waxed plywood (paraffin 5205, 30 g/m²) + Heavy surface film/pilot test | 220 | 10 | 21 |
| 22 | Waxed plywood (paraffin 5205, 50 g/m²) + Heavy surface film/pilot test | 220 | 6 | 14 |

It was discovered that e.g. different paraffins, AKD (alkene ketene dimer) and silicones are particularly effective in preventing rippling, i.e. swelling of the wood grains, in plywood. The tests indicated that hydrophobizing the surface before coating improves the properties. In addition, it was found in the tests that plywood may be easily coated after the hydrophobization treatment of the surface if suitable hydrophobizing agents, such as paraffins, AKD or silicone oil, are used.

The method according to the invention is suitable in different embodiments for treating various materials, e.g. plywood, chipboard and other wood board products.

The embodiments of the invention are not limited merely to the examples referred to above; instead, many variations are possible within the scope of the accompanying claims.

The invention claimed is:

1. A method for treating a plywood or an oriented strand board for use as a mold form for molding concrete, the method comprising: (a) providing a hydrophobic composition containing a hydrophobic agent in an amount of 60 to 100% by weight on a surface of the plywood or the oriented strand board; (b) coating the plywood or the oriented strand board with a coating agent to form a coating layer on the surface of the plywood or the oriented strand board treated with the hydrophobic composition to form a treated plywood or oriented strand board, wherein the hydrophobic agent comprises alkene ketene dimer, and wherein the hydrophobic composition and the coating layer are provided on the plywood or the oriented strand board by hot pressing sufficient to cause the hydrophobic agent to penetrate into wood grains in the plywood or the oriented strand board, and wherein the amount of hydrophobic composition provided on the surface of the plywood or the oriented strand board is 30-50 $g/m^2$, and wherein the coating agent forms a film and comprises one or more resins selected from phenolic resin, amino resin, acrylate resin, urea resin, melamine resin, or urea melamine resin; and (c) molding concrete using the treated plywood or oriented strand board.

2. The method according to claim 1, wherein the hydrophobic composition is provided on the surface of the plywood or the strand board before coating with the coating agent.

3. The method according to claim 1, wherein the hydrophobic composition is provided on the surface of the plywood or the strand board with the coating layer.

4. The method according to claim 1, wherein the hydrophobic composition is provided in a carrier material from which it is conveyed to the surface of the plywood or the strand board.

5. The method according to claim 1, wherein the hydrophobic composition is provided as a layer separate from the coating layer.

6. The method according to claim 1, wherein the coating agent comprises phenol-formaldehyde resin.

7. The method according to claim 1, wherein the coating agent comprises melamine-formaldehyde resin.

8. The method according to claim 1, wherein the coating agent comprises phenolic and amino resins.

9. The method according to claim 1, wherein the hydrophobic composition is a solid form.

10. The method according to claim 1, wherein the coating layer is provided on the surface of the plywood or the oriented strand board at 220 $g/m^2$.

11. The method according to claim 1, wherein the coating agent comprises phenolic resin.

12. The method according to claim 1, wherein the hydrophobic composition contains the hydrophobic agent in the amount of 100% by weight.

13. The method according to claim 1, wherein the hydrophobic composition comprises 100% by weight alkene ketene dimer.

* * * * *